July 10, 1945.  E. J. DEISLEY ET AL  2,380,031
VEHICLE STRUCTURE, ESPECIALLY VEHICLE FRONT END STRUCTURE
Filed Aug. 2, 1940  4 Sheets-Sheet 1

INVENTORS:
Edward J. Deisley
Theodore Ulrich &
BY Alexander R. Lindsay
John P. Tarbox
ATTORNEY

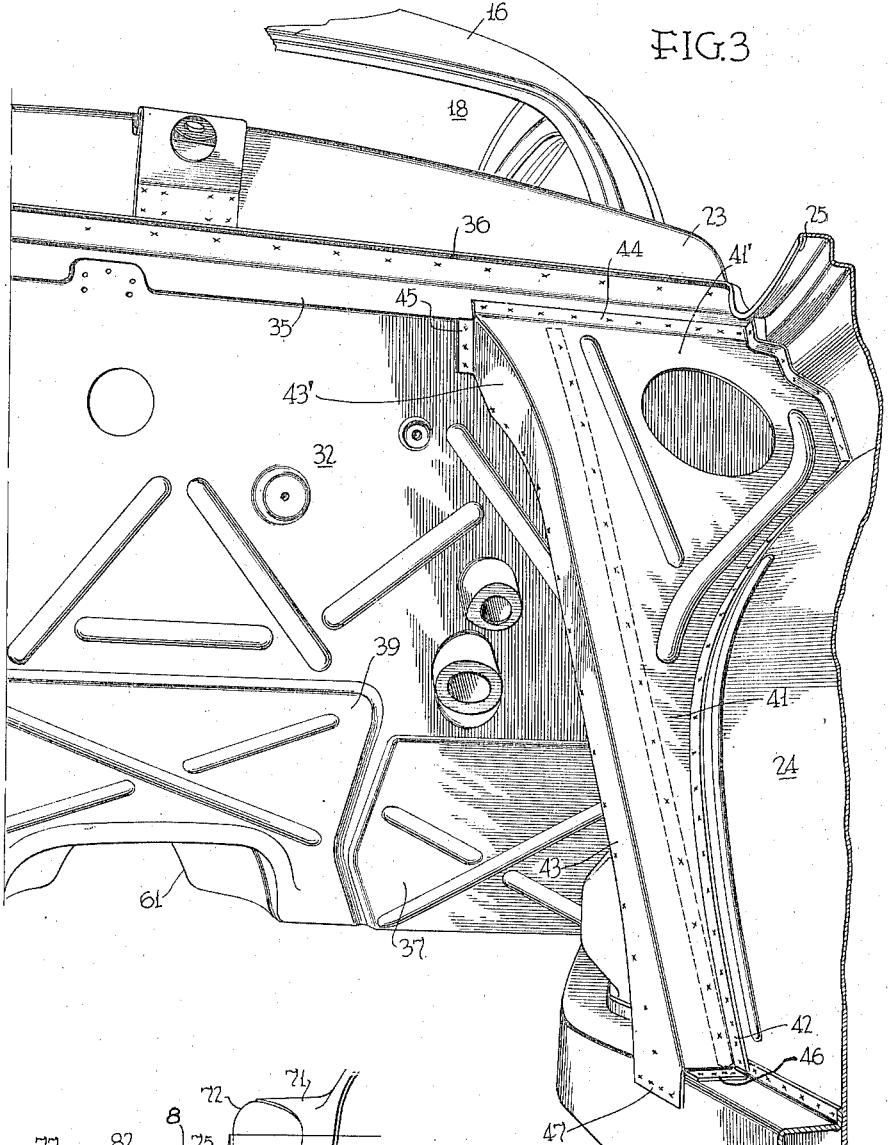
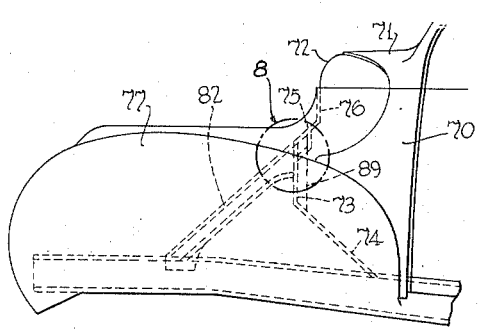

July 10, 1945.  E. J. DEISLEY ET AL  2,380,031
VEHICLE STRUCTURE, ESPECIALLY VEHICLE FRONT END STRUCTURE
Filed Aug. 2, 1940  4 Sheets-Sheet 3

INVENTORS
Edward J. Deisley
Theodore Ulrich
Alexander R. Lindsay
BY John P. Tarbox
ATTORNEY INVENTORS.
Edward J. Deisley
Theodore Ulrich
Alexander R. Lindsay
BY
ATTORNEY Patented July 10, 1945

2,380,031

UNITED STATES PATENT OFFICE 2,380,031

VEHICLE STRUCTURE, ESPECIALLY VEHICLE FRONT END STRUCTURE

Edward J. Deisley, Theodore Ulrich, and Alexander R. Lindsay, Detroit, Mich., assignors to Edward G. Budd Manufacturing Company, Philadelphia, Pa., a corporation of Pennsylvania Application August 2, 1940, Serial No. 349,704

7 Claims. (Cl. 296—28)

The invention refers to vehicle bodies, especially automobile bodies, and more specifically to the end section, such as the front end, of such bodies.

It is among the objects of the invention to improve vehicle bodies such as automobile bodies in general and more particularly bodies of the self-sustaining type, that is of the type which act as their own chassis.

It is, furthermore, among the objects of the invention to improve the end structure of those vehicle bodies as are disclosed and claimed in the copending application Serial No. 191,396 "End wall construction for vehicle bodies," filed February 19, 1938, now Patent No. 2,289,395, and Serial No. 299,595, "Vehicle body," filed October 16, 1939, both of the applicant Ulrich.

In this connection it is pointed out that the present application has to do with the same body, other features of which are disclosed and claimed in the simultaneously filed application "Vehicle structure especially tonneau bottom structure," Serial No. 349,922, of applicant Ulrich.

Certain features disclosed herein form the subject matter of copending application, Serial No. 430,060, "Vehicle body underframe or chassis," of the inventors Ulrich and Lindsay, which was filed February 9, 1942, as a division of the present application.

It is, in particular, among the objects of the invention to create a modified form of an inclined transverse wall structure of the type disclosed in said patent and the first-named application, Serial No. 299,595, so as to simplify the construction without weakening it and so as to gain more space and better accessibility.

A further object of the invention refers to the suspension of the radiator between the extensions of the side walls of the body, particularly of a self-sustaining body.

With these and other objects in view, the invention consists among others in the arrangement of a pair of elongated members in the general form of a web or sheet which are spaced from each other and from the vertical longitudinal middle plane of a vehicle body, one of such members having one of its margins conforming and fastened to one body side wall extension and the other having one of its margins conforming and fastened to an extension of the other side wall, said two members being arranged substantially in one transverse plane, which plane is inclined toward the transverse vertical middle plane of the vehicle, said members having, furthermore, their upper ends of greater width than the width of their lower ends and fastened to the upper portion of a transverse body wall such as a shroud pan, this arrangement providing between those members and the transverse walls an opening through which a vehicle part such as a motor may extend, and said members being adapted to transmit stresses from a lower end portion of the vehicle upwardly and longitudinally in the direction toward the transverse middle plane of the body and into the upper part of the latter.

The transverse wall, referred to in the preceding paragraph, has according to another feature of the invention its central portion between the aforesaid inclined members offset toward the interior of the body so as to make room for parts of the power unit and to form a shroud pan which greatly contributes to the stiffness and load-carrying capacity of the body.

Another feature of the invention consists in the suspension of the radiator on elongated members of web cross-section which are fastened to the before-mentioned body side wall extensions.

Further objects and advantages and the details of the invention will become apparent from the following description of an embodiment of the invention when read in conjunction with the attached drawings.

In the drawings:

Figure 3 is a fragmentary front elevation of a part of the shroud pan and adjoining parts of the body certain members being shown in section.

Figure 7 is a fragmentary and diagrammatic side elevation of a modified body front end.

Figure 1:
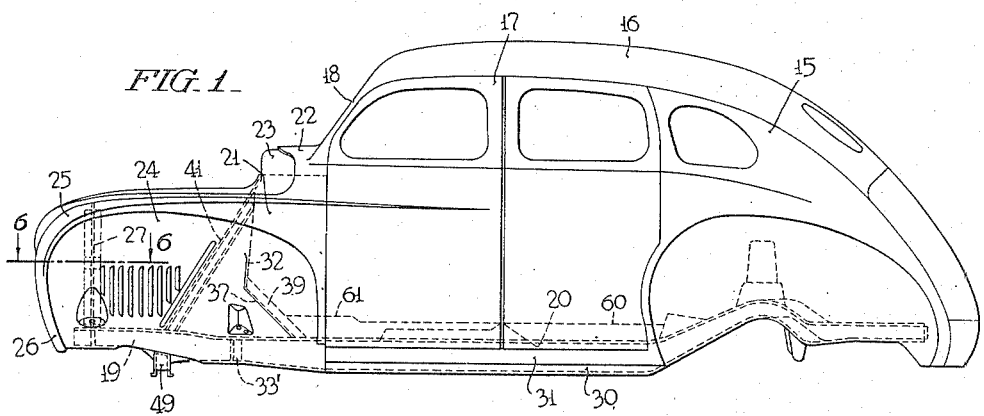
Figure 1 is a diagrammatic side elevation of a four-door vehicle body of the self-sustaining type, the running gear, the automotive organs and certain other parts, such as the motor hood, being omitted.
Figure 2:
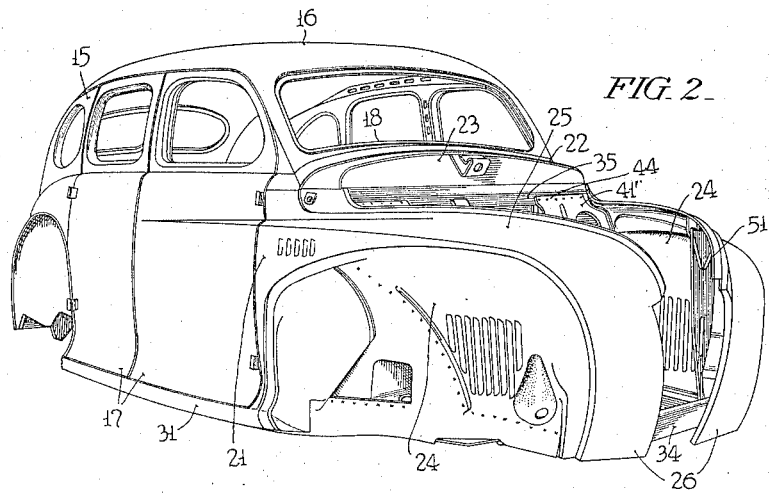
Figure 2 is a three-quarter front and side elevation of the same body.
Figure 5:
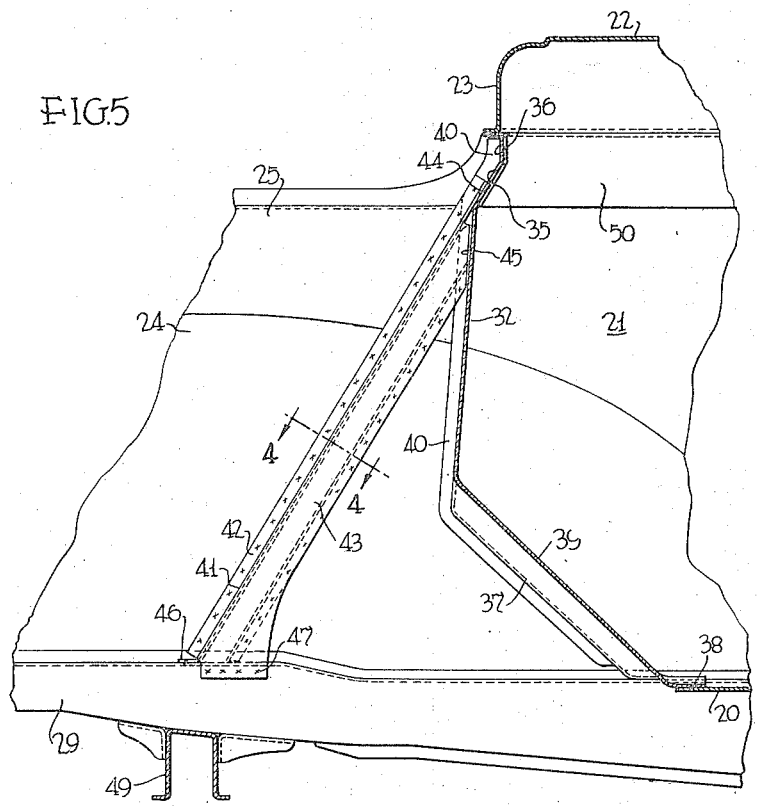
Figure 5 is a fragmentary side elevation of certain parts of the body interior, transversely extending members being shown in section along the longitudinal vertical middle plane of the body.
Figure 4:
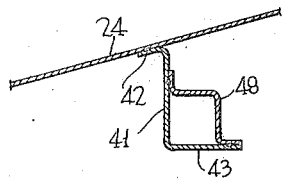
Figure 4 is a section along line 4—4 of Figure 5.

In the embodiment shown in Figures 1 to 6, the body comprises as main elements side walls 15, a roof 16, doors 17, a front wall with a windshield 18, longitudinal side sill structures 19 and a floor panel 20. The details of the rear end construction of this body are shown and described in the above-mentioned simultaneously filed application "Vehicle structure especially tonneau bottom structure," Serial No. 349,922.

Figure 6:
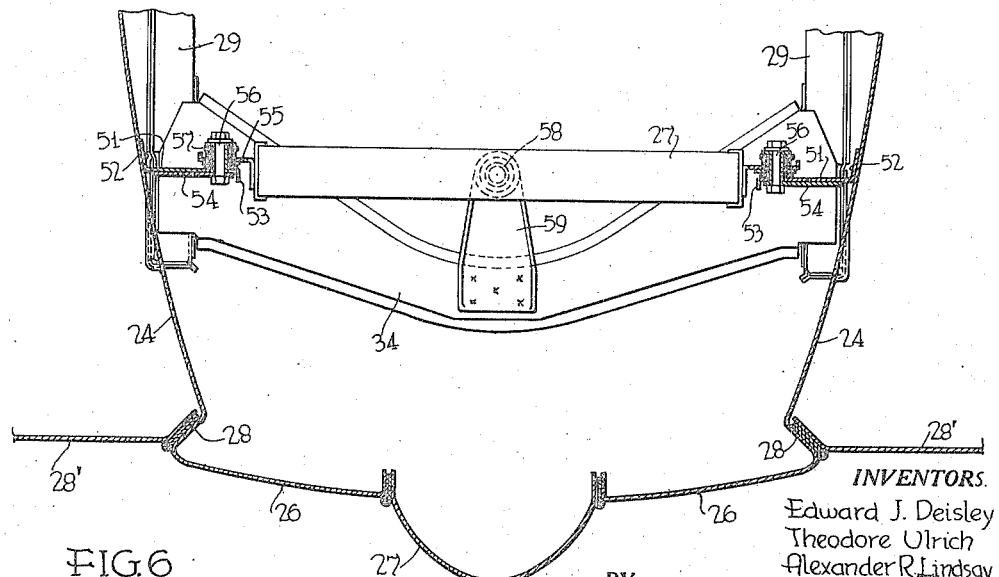
Figure 6 is a horizontal section through the front end of the vehicle at about line 6—6 of Figure 1, yet showing certain parts which are omitted in Figure 1.

The forward portion of the side walls 15 form the side walls 21 of a cowl, the upper ends of these cowl side walls being interconnected by a cowl top 22; the front margin of this cowl top extends downwardly at 23, the cowl sides 22 being extended forwardly as to form side walls 24 of a motor compartment and at the same time inner walls of front wheel housings. Along their upper margins and along their front margins, these side wall extensions 24 are curved toward the longitudinal vertical middle plane of the body so as to form marginal upper wall portions 25 and marginal front wall portions 26 of the motor compartment. The opening between the front wall portions 26 is closed by the radiator core 27 (Figure 6). At the offset junction 28 between the wheel housing portions 24 on the one hand and the upper wall portions 25 and the front wall portions 26 on the other hand to the front wheel mud guards 28' are attached. The opening between the radiator core, the marginal upper wall portions 25 and the cowl top 28 will be closed by a conventional swingable hood member which is not shown in the drawings.

The lower margins of the body side wall panels 15, the cowl side 21 and the side wall extension 24 are reinforced and supported by the before-mentioned longitudinal side sill structures 19. These structures comprise an outwardly facing channel member 29 which is by marginal flanges fastened in the region of the doors 17 to an inwardly facing channel-shaped member 30, likewise provided with marginal flanges. This member 30 may form an integral part of a so-called monopiece side panel stamping. A further threshold member 31 which has its outer portion merging into the contour of the doors 17 is attached to the member 30 either permanently or, so as to facilitate its replacement in case of an accident, detachably. The sill members 29 are interconnected at their forward ends by a strong transverse beam 34.

The shroud pan or panel 32 has its main portion arranged in a substantially vertical transverse plane and continued by an upwardly and rearwardly inclined upper portion 35 which ends in a vertically and then forwardly extending marginal part 36 by which latter it is fastened to a flange of the cowl top portion 23. The shroud pan is, furthermore, provided with a downwardly and rearwardly extending lower portion 37 which forms the toe board and which has its lower, about horizontal marginal portion 38 overlapping and fastened to the forward end of the floor panel 20 proper. 39 is the usual offset panel section which extends over the gear box and the coupling and which may be closed in the form of a removable cover. The shroud pan 32 with its portions 35, 36 and 37 has its side margins shaped so as to conform and to snugly fit substantially throughout their entire length against the cowl sides 21 and the wheel housing walls 24, and these margins are each provided with a flange 40 which extends in the longitudinal direction of the body and overlaps and is fastened to said wall portions such as by electric spot welding.

An elongated member 41 in the general form of a web or sheet is arranged on either side of the longitudinal vertical middle plane of the body. These members are substantially Z-shaped in transverse section with an outer marginal arm 42 and a wider inner marginal arm 43 and are arranged in a transverse plane which is inclined toward the transverse vertical middle plane of the body. The upper ends of the members 41 are widened at 41', the inner arm 43 being in this section curved toward the longitudinal middle plane of the vehicle at 43'. The outer margins with the arms 42 of the members 41 are shaped so as to snugly fit over the adjacent wheel housing portions 24 and the upper motor compartment wall portions 25 and are rigidly connected along their entire lengths to those wall portions, preferably by electric spot welding. The upper transverse margins of the members 41 overlap at 44 and are connected such as by spot welding to the inclined upper portion 35 of the shroud pan, whereas a flange 45 transversely bent off from the upper end 43' of the inner arm 43 is fastened in the same manner to the vertical main portion of the shroud pan 32.

At their lower ends, the members 41 each overlap by a forwardly extending flange or tongue 46 and by the lower end 47 of the arm 43, the tops and sides respectively of the sill members 29 and are connected to the same. The inner margins of the members 41 are reinforced by angle section members 48 which overlap by marginal flanges the main bodies and the arms 43, respectively, of the members 41 and are rigidly connected thereto so as to form closed box-sectional beam structures. The upper and lower ends of the reinforcing members 48 are likewise connected by overlapping parts to the shroud pan 32 and the upper walls of the side sill members 29.

The forward lower ends of the inclined reinforcing members 41 are located at about the points where a transverse axle member 49 is attached to the sill members 29. Therefore, the stresses exerted by the wheels on this member 49 are practically immediately transmitted into the inclined reinforcements 41 and thence into the upper portion of the body. It will also be noted that the main body of the members 41 is arranged in about the same transverse inclined plane as the portions 35 of the shroud pan. For further aiding in the transmission of stresses from the members 41 into the front door posts and from there into body frame members above the door openings and into the roof, brackets 50 are provided in the interior of the cowl near to the side walls 21 thereof. These brackets 50 extend from the shroud pan at about the upper ends of the members 41 to the front door posts; the connection between the brackets 50 and the front posts is not shown on account of a similar arrangement being disclosed in the above-mentioned application Serial No. 191,396.

Attached to the side wall portions 24 and to the upper wall portions 25 of the motor compartment is a second pair of elongated members 51. These members are arranged about vertically and forwardly spaced from the shroud pan 32 and the members 41, and near to the forward end of the body in the region of the underframe transverse member 34. The outer rearwardly flanged margins 52 of the members 51 conform again to the wall portions 24, 25 and are fastened thereto. The inner forwardly flanged margins 53 of the members 51 are substantially straight and about vertical in front elevation. The members 51 are additionally reinforced by a plate 54. Arranged between and substantially in the plane of the members 51 is the radiator 27 of substantially conventional design. Attached by one of their arms to the vertical sides of this radiator 27, are supporting members 55 angle-shaped in transverse section, whereas the other arms of these members 55 overlap to a certain extent the adjacent member 51. The members 51 and 55 are connected to each other by means of one bolt 56 each and an interposed resilient bushing 57 preferably of rubber or the like. A similar, one-point resilient connection 58 (not shown in detail) is provided between the middle portion of the lower horizontal side of the radiator 27 and a bracket 59 of the transverse beam 34.

The members 51 with their flanges 52, 53 and the reinforcing plate 54 do in themselves strongly reinforce the wall portions 24, 25; they act also as baffle plates between those walls and the radiator 27; furthermore, they support the radiator and form together with the radiator a strong transverse brace between the opposite wall portions of the motor compartment. The third suspension point 58 for the radiator may under certain conditions be dispensed with.

The toe board 37 has, as outlined before, its middle portion 39 rearwardly offset as to accommodate the projecting portion of the power plant (not shown) such as part of the coupling and of the gear. This projection extends into the forward part of the floor panel 20 at 60 and into the customary tunnel 61 for the longitudinal driving shaft (not shown). It should be noted that the toe board portion 39 and the floor panel portion 61 are free from the customary large opening, whereby a great increase in strength and rigidity of the body front end structure is attained.

Figure 8:
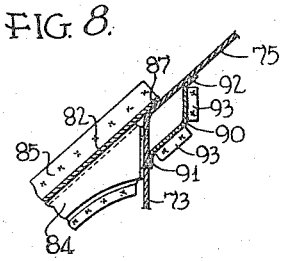
Figure 8 is an enlarged fragmentary section along the vertical longitudinal middle plane of the body shown in Figure 7 in the region of the circle 8 of Figure 7.
Figure 9:
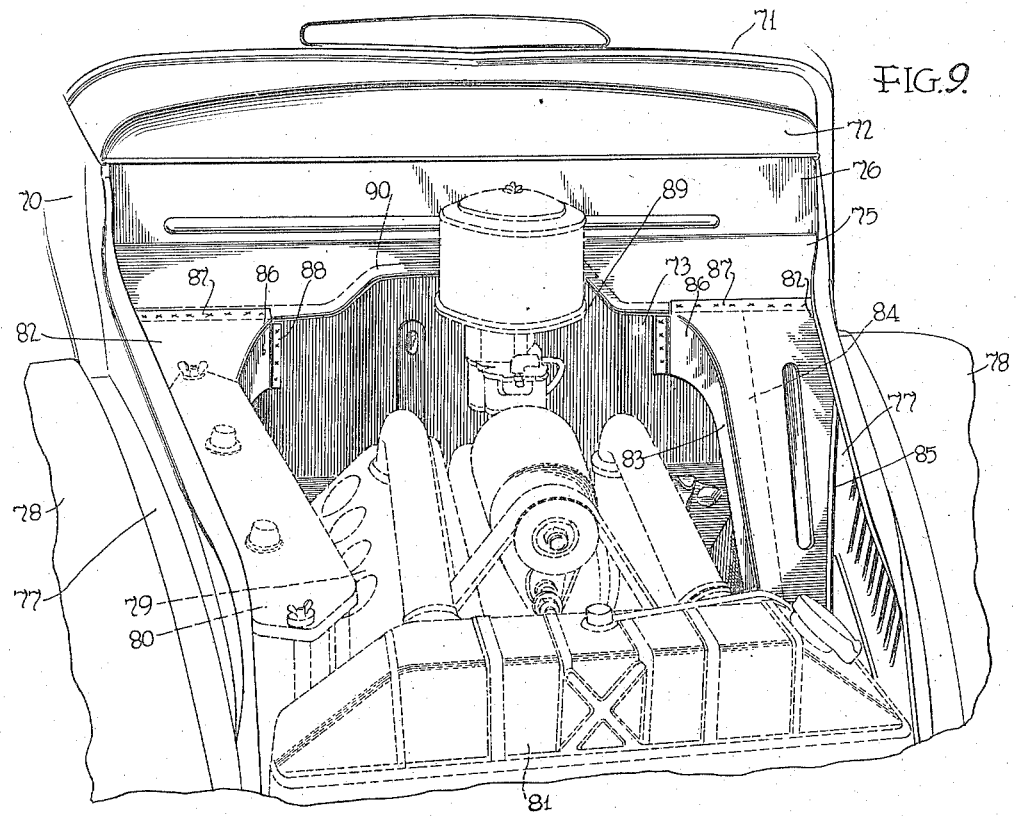
Figure 9 is a perspective fragmentary view into the motor compartment at the front end of the body with the radiator and the motor in place, of the embodiment according to Figure 7.

In the modification shown in Figures 7, 8 and 9, the cowl sides are designated 70, the cowl top 71, the downward extension of the cowl top 72, the shroud pan 73, the latter with the toe board portion 74, the upwardly and rearwardly inclined portion 75 and the adjoining upper marginal portion 76. 77 are the forward extensions of the cowl sides which form side walls for the motor compartment and the inner walls of the wheel housings and to which the mud guards 78 are fastened. 79 indicates the motor, 80 the electric battery and 81 the radiator.

82 are the rearwardly inclined elongated bracing members which have their lower ends fastened to the underframe structure in a fashion corresponding to that shown for the first embodiment. Also the form of these members is similar and comprises an inner marginal flange 83 to which a reinforcing member 84 is fastened so as to form a box-sectional rail. 85 are the outer flanges of the members 82 by which they are fastened to the side wall extensions. At the upper ends, the flanges 82 are carried inwardly at a more generous curve 86 than in the first embodiment. The connection between the upper end of the member 83 to the dash-board 73 and its extension 75 by means of the extensions 87, 88 is substantially the same as in the first embodiment. The about vertical main body of the dash-board 75 shows a rearward offset 89 which extends into the inclined dash-board section 75 so as to give more room for the power plant. The side walls of this offset portion 89 may be considered as continuations of the curved upper portions 86 of the arms 83 of the inclined reinforcing members 82 and help in distributing stresses from those members into the remainder of the vehicle body.

An additional reinforcement of the body in the region of the dash-board where the inclined reinforcing members are attached is achieved by an angle-section rail 90 which is fastened by flanges 91, 92 to the vertical portion of the dash-board 73 and to its rearwardly inclined portion 75 so as to form a box-sectional girder with those portions. The ends of this member 90 may be fastened by flanges 93 to the cowl sides. The member 90 is, as indicated in Figure 12, carried without interruption around the rearward offset 89 of the dash-board.

While the shown and described embodiments are designed for sheet metal bodies, it is obvious that the invention is also applicable to bodies which are built up partly or completely from other materials suited for the purpose. It is moreover obvious that the invention is not necessarily restricted to a compartment at the front end of an automobile but is also applicable to a compartment in the rear of the body and, furthermore, applicable to certain other types of vehicles apart from automobiles. All such possible applications and many other modifications are intended to be covered by the language and spirit of the following claims:

What is claimed is:

1. In a vehicle body having side walls extended beyond and integrally connected with one of its end walls; a pair of members in the form of elongated webs arranged substantially in a transverse plane inclined upwardly and toward the upper part of the end wall; each of said members having one of its margins conforming and fastened substantially throughout to one of the extended side walls; the upper ends of said members being wider than the lower ends in said transverse plane and being fastened substantially throughout their width to said end wall yet leaving a wide open space between their juxtaposed margins; said members, extended side walls and said end wall mutually interbracing each other in longitudinal and transverse direction and being adapted for the transmission of stresses in the direction of said plane without substantially decreasing the space between said extended side walls.

2. In a vehicle body according to claim 1, said members having outwardly flaring upper ends whereas their juxtaposed margins are closed to parallel so as to obtain the bracing effect of widened ends without encroaching upon the space between the members.

3. In a vehicle body according to claim 1, flanges along the juxtaposed margins of said members and angle section rails connected along their length to said flanges and the main bodies of the members so as to form closed box-sectional marginal structures having their upper ends attached to said body end wall.

4. In a vehicle body according to claim 1, said end wall having an upper section arranged at an angle to its adjoining lower section, said members having their upper ends fastened to the end wall substantially along the line where said two sections meet, an angle section transversely extending rail having its margins fastened respectively to said sections so as to form therewith a closed box-sectional structure adapted for aiding in the distribution of stresses from the upper ends of said members over the adjoining regions of the end wall.

5. In a vehicle body according to claim 1, said end wall having an upper section arranged at an angle to its adjoining lower section, said members having their upper ends fastened to the end wall substantially along the line where said two sections meet, an angle section transversely extending rail having its ends extended and fastened to the body side walls and its margins fastened respectively to said sections so as to form therewith a closed box-sectional structure adapted for aiding in the distribution of stresses from the upper ends of said members over the adjoining regions of the end wall and the side walls.

6. In a vehicle body according to claim 1, said end wall having plane lateral portions and a central portion which is offset toward the interior of the body, said members being arranged at the sides of the offset portion and attached to the plane lateral portions.

7. In a vehicle body, side wall extensions integrally connected to and projecting beyond an end wall so as to form a motor compartment, reinforcements for the projecting side wall extensions in the form of pairs of webs integrally secured on edge to said extensions, one pair of webs extending in a plane inclined upwardly toward said end wall and being also secured to the latter, a second pair of webs extending about vertically near the outer end of the compartment, said last named webs supporting between them a radiator and forming therewith a transverse bulkhead mutually interbracing the outer ends of the side wall extensions.

EDWARD J. DEISLEY.
THEODORE ULRICH.
ALEXANDER R. LINDSAY.